United States Patent
Mittelhäuser et al.

[11] Patent Number: 6,089,644
[45] Date of Patent: Jul. 18, 2000

[54] TANK LID FOR CLOSING OFF THE TANK CONNECTOR OF MOTOR VEHICLES

[75] Inventors: Bernhard Mittelhäuser, Am Krähenberg, D-30900 Wedemark; Uwe Thiesen, Dinklage, both of Germany

[73] Assignee: Bernhard Mittelhäuser, Germany

[21] Appl. No.: 09/187,037

[22] Filed: Nov. 5, 1998

[30] Foreign Application Priority Data

Nov. 6, 1997 [DE] Germany ............... 197 48 975

[51] Int. Cl.⁷ ................................. B60K 15/05
[52] U.S. Cl. ...................... 296/97.22; 220/86.2
[58] Field of Search ............ 296/97.22, 216.09, 296/216.06; 220/86.2, DIG. 33; 280/834

[56] References Cited

U.S. PATENT DOCUMENTS

| | | | |
|---|---|---|---|
| 3,374,007 | 3/1968 | Ingolia | 296/97.22 X |
| 4,676,493 | 6/1987 | Helbig | 296/216.06 |
| 4,891,913 | 1/1990 | Shimura et al. | 296/216.09 X |
| 5,437,491 | 8/1995 | Nedbal et al. | 296/97.22 |
| 5,673,958 | 10/1997 | Gramss | 296/97.22 |
| 5,829,620 | 11/1998 | Harris et al. | 220/DIG. 33 |

*Primary Examiner*—Joseph D. Pape
*Attorney, Agent, or Firm*—Robert W. Becker & Associates

[57] ABSTRACT

A lid for closing off the tank connector of a motor vehicle is provided. An annular, elastic seal is disposed in a groove in an outer periphery of the lid. The seal serves for sealing the gap between the rim of the lid and the outer surface of the vehicle. At least part of the cross-sectional portion of the seal that faces the groove comprises an elastomeric material that is considerably harder than the actual sealing part.

11 Claims, 1 Drawing Sheet

TANK LID FOR CLOSING OFF THE TANK CONNECTOR OF MOTOR VEHICLES

BACKGROUND OF THE INVENTION

The present invention relates to a lid for closing off the tank connector of motor vehicles, with the lid having an annular seal disposed in a circumferential groove in an outer periphery of the lid, the seal serving for sealing the gap between the rim of the lid and the outer surface of the vehicle.

In order with the known lids of this type to be able to adequately securely attach the sealing rings, special glues and adhesives were needed for securing the sealing rings in special operations, after which the lids were generally finished to the desired color. These additional operations not only make the manufacture of the lids more expensive, but also result in relatively high rates of rejection.

It is therefore an object of the present invention to eliminate the drawbacks of the heretofore known lids; accordingly, the aforementioned adhesives should be unnecessary to have, and manufacturing defects should furthermore be extensively eliminated.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
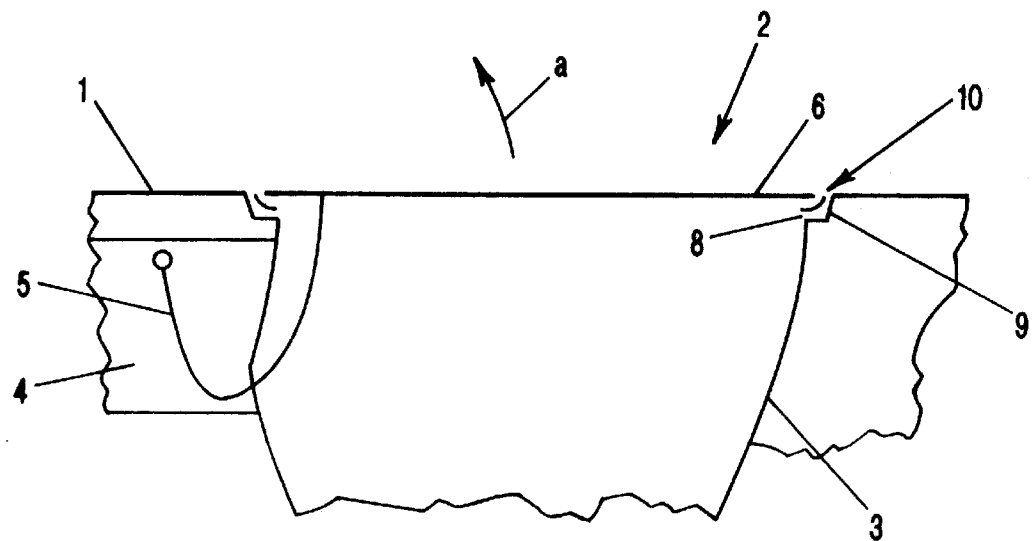
FIG. 1 is a partial cross-sectional view through the outer surface of a motor vehicle with a cupshaped receptacle for receiving the tank connector, and shows one exemplary embodiment of the pivotably mounted lid that is designed for closing off the receptacle and in this embodiment has a round contour.

To realize the object of the present invention, at least part of the cross-sectional portion of the sealing ring that faces the lid, in other words the groove thereof, comprises an elastomeric material that is considerably harder than the actual, preferably lip-shaped, sealing part; degrees of hardness of more than 15 Shore can be selected, and the cross-sectional parts of the sealing ring having different hardnesses can be fixedly interconnected.

Such sealing rings, as shaped or molded bodies, are manufactured in such a way that already during their manufacture a fixed connection results between the aforementioned cross-sectional portions. In other words, the sealing ring is supplied as a finished component and is used in this form during fabrication of the lid.

Assembly of the sealing ring can be achieved by means of an undercut groove on the lid body into which the sealing ring is forced (so-called snapping-in), in order to hold the ring in the groove by means of its own inherent elastic tension. In addition, however, a securement of the sealing ring can also be achieved by a contraction process. For this purpose, the sealing ring is heated and in the stretched state is placed in the assembled position. Fixation is then effected by contraction of the sealing ring that takes place during cooling, thereby providing engagement in the peripheral groove of the lid body.

The two aforementioned cross-sectional portions are disposed and dimensioned in such a way that the harder cross-sectional portion ensures that the sealing ring is held within its groove. The harder region (the base portion) is arranged in such a way that it is disposed within the pertaining groove, whereby it can completely fill this groove, whereas the cross-sectional portion that is designed for the sealing is predominantly, preferably however entirely, disposed beyond the cross-section of the groove in order to be able to fulfill the sealing function in a particularly favorable manner by elastic deformation, generally by bending or deflection.

Further specific features of the present invention will be described in detail subsequently.

DESCRIPTION OF PREFERRED EMBODIMENTS

Referring now to the drawing in detail, the outer surface 1 of the vehicle has a cutout 2 that serves for accommodating a receptacle 3, the bottom of which is open for the passage of the tank connector. At the side, the receptacle 3 has a recessed area 4 for the pivotable mounting of a pivot arm 5 to which the tank lid 6 is secured. As a result, the tank lid 6 can pivot in the direction of arrow "a".

Figure 2:
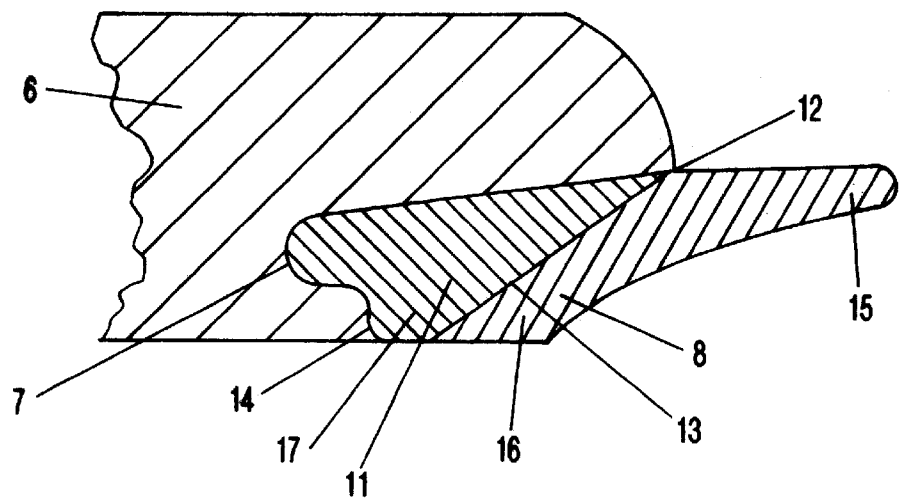
FIG. 2 is an enlarged cross-sectional view of the edge portion of the tank lid of FIG. 1.

As shown in FIG. 2, the outer rim of the tank lid 6 is provided with a peripheral groove 7 for receiving a gasket or sealing ring 8, an outer side of which sealingly rests against a shoulder 9 of the receptacle 3. This sealingly closes off the gap 10.

The special feature of the present invention consists in the construction of the sealing ring 8 with the objective of bringing about fixation of these sealing rings in the peripheral groove 7.

The base 11 of the sealing ring 8 fills the peripheral groove 7 and extends to the outer edge 12 of the tank lid 6. From there, the base 11 extends along a conical surface 13 to within the vicinity of the lower edge 14 of the peripheral groove 7. The tongue-shaped annular projection 15 as a softer cross-sectional portion of the sealing ring 8 is fixedly connected with the base 11 and is disposed toward the outside. As a consequence of the conical surface 13, the projection 15 extends to within the vicinity of the lower edge 14 below the outer edge of the tank lid 6.

This configuration of the projection 15 permits an elastic deformation by bending or deflection, while the downwardly directed cross-sectional portion 16 permits an elastic support perpendicular to the plane of the lid.

The ring 8 comprises an elastomeric material; however, the base 11 is hard with a Shore hardness of about 70–90, while the projection 15 that is connected thereto and that is provided with the cross-sectional portion 16 is soft elastic, having a lesser hardness of about 15–30 Shore A.

This construction of the sealing ring 8 has the advantage that it eliminates the need for adhesive, and the fixation of the sealing ring 8 can be accomplished by means of the aforementioned base 11. In this connection, the fixation is effected by heating and contraction of the sealing ring 8 upon the prescribed cross-sectional form of the tank lid. However, it is also possible, as mentioned, to bring about the fixation by so-called snapping-in with the presence of undercuts in the groove region.

It is to be understood that the present invention is not tied to a particular shape of the tank lid 6 and of the receptacle 3.

As can be seen from FIG. 2, the edge 14 is displaced radially inwardly relative to the edge 12. In order under these conditions to prevent the sealing ring 8 from collapsing downwardly, a support projection or shoulder 17 of the base 11 of the sealing ring rests against the edge 14. In other words, the shoulder 17 is disposed between the edge 14 and the portion 16 of the sealing means 8. The bottom of the support shoulder 17 is thus flush with the underside of the lid 6.

The specification incorporates by reference the disclosure of German priority document 197 48 975.3 of Nov. 6, 1997.

The present invention is, of course, in no way restricted to the specific disclosure of the specification and drawing, but also encompasses any modifications within the scope of the appended claims.

What is claimed is:

1. A lid for closing off a tank connector of a motor vehicle, comprising:

an annular, elastic sealing means disposed in a groove in an outer periphery of said lid, said sealing means serving for sealing a gap between a rim of said lid and an outer surface of said vehicle, wherein at least part of a cross-sectional portion of said sealing means that faces said groove comprises an elastomeric material that is considerably harder than a tongue-shaped sealing part of said sealing means.

2. A lid according to claim 1, wherein said actual sealing part is lip-shaped.

3. A lid according to claim 1, wherein a hardness degree difference of approximately 15–30 Shore A exists between said cross-sectional portions of said sealing means.

4. A lid according to claim 1, wherein said cross-sectional portions of different hardness of said sealing means are fixedly interconnected.

5. A lid according to claim 1, wherein said harder cross-sectional portion of said sealing means comprises a material that is capable of shrinking under the influence of heat to effect fixation of said sealing means in said groove of said lid.

6. A lid according to claim 1, wherein said harder cross-sectional portion of said sealing means is adapted to be pressed, accompanied by elastic deformation thereof, into said groove of said lid, which groove is an undercut groove.

7. A lid according to claim 1, wherein said harder cross-sectional portion of said sealing means extends from a projecting outer edge of said lid at an angle inwardly in the form of a conical surface to the vicinity of a lower side edge of said groove.

8. A lid according to claim 7, wherein said softer cross-sectional portion of said sealing means has a lip-shaped projection in the vicinity of said outer edge of said lid and also has a portion that covers said conical surface.

9. A lid according to claim 1, wherein said sealing means is held in said groove without glue or adhesive.

10. A lid according to claim 1, wherein a lower edge of said peripheral groove is disposed radially inwardly relative to a radially outer edge of said lid, and said sealing means is provided with a support shoulder that rests against said lower edge.

11. A lid according to claim 10, wherein said sealing ring is essentially flush with an underside of said lid.

* * * * *